ns Patent [19]

Kishida et al.

[11] 4,367,245
[45] Jan. 4, 1983

[54] COATING COMPOSITION AND PROCESS FOR PREPARING SYNTHETIC RESIN SHAPED ARTICLES BY USING SAME

[75] Inventors: Kazuo Kishida; Isao Sasaki; Kenji Kushi; Misao Tamura, all of Otake, Japan

[73] Assignee: Mitsubishi Rayon Company, Ltd., Tokyo, Japan

[21] Appl. No.: 246,942

[22] Filed: Mar. 24, 1981

[30] Foreign Application Priority Data

Apr. 3, 1980 [JP] Japan ................. 55-43995

[51] Int. Cl.³ ............................................. B05D 3/06
[52] U.S. Cl. .......................... 427/54.1; 204/159.15; 204/159.16; 204/159.19; 204/159.22; 204/159.23
[58] Field of Search ................ 204/159.15, 159.16, 204/159.19, 159.22, 159.23; 427/54.1

[56] References Cited

U.S. PATENT DOCUMENTS 3,518,341 6/1970 Haryn .................... 264/255
4,041,120 8/1977 Oshima et al. .......... 264/255
4,199,421 4/1980 Kamada et al. ......... 204/159.22
4,273,799 6/1981 Kamada et al. ......... 204/159.23
4,273,802 6/1981 Kamada et al. ......... 204/159.23
4,284,707 8/1981 Nagasawa et al. ....... 204/159.23
4,287,227 9/1981 Kamada et al. ......... 204/159.23

FOREIGN PATENT DOCUMENTS 13939 6/1980 European Pat. Off. .

Primary Examiner—Melvyn I. Marquis
Attorney, Agent, or Firm—Oblon, Fisher, Spivak, McClelland & Maier

[57] ABSTRACT

A coating composition for the preparation of synthetic resin shaped articles excellent in abrasion resistance and weatherability is described. This composition comprises (a) a polyfunctional monomer mixture comprising (i) 25-75 wt. % of at least one polyfunctional monomer of the formula (I):

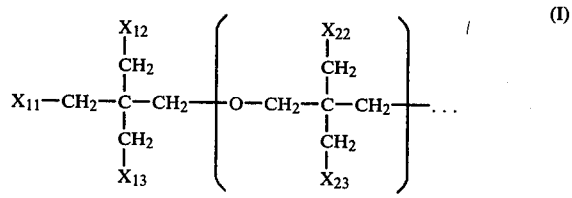

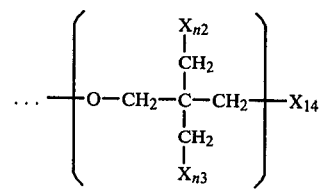

wherein at least three of $X_{11}$, $X_{12}$, $X_{13}$, $X_{22}$, $X_{23}$–$X_{n2}$, $X_{n3}$ and $X_{14}$ are $CH_2=CH.COO-$ and the remaining groups are $-OH$, and n is an integer of 1–5, (ii) 25–75 wt. % of at least one polyfunctional monomer of the formula (II):

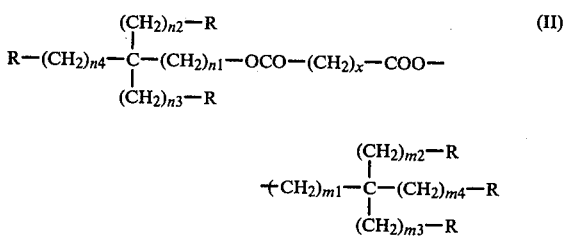

wherein at least three of the R groups are $CH_2=CH COO-$ and each of the remaining is H or $-OH$, $n_1$, $n_2$, $n_3$, $n_4$, $m_1$, $m_2$, $m_3$ and $m_4$ are integers of 0, 1 or 2, and X is an integer of 1 to 10 and (iii) 0 to 50 wt. % of a monomer containing one acryloyloxy group and having a boiling point of at least 150° C. at normal pressure and a viscosity of not higher than 20 cps/20° C., and (b) 0.01–6.0 wt. parts, based on 100 wt. parts of the polyfunctional monomer mixture, of at least one photosensitizer. The coating composition is coated on a synthetic resin shaped article and then, irradiated with utraviolet rays in air to form a crosslinked coating film having a thickness of 1–30 microns.

14 Claims, No Drawings

COATING COMPOSITION AND PROCESS FOR PREPARING SYNTHETIC RESIN SHAPED ARTICLES BY USING SAME

BACKGROUND OF THE INVENTION

1. Field of the Invention

This invention relates to a coating composition which provides under irradiation with ultraviolet rays in air a crosslinked and cured coating film excellent in the abrasion resistance, flexibility, heat resistance, solvent resistance, adhesion to the substrate and weatherability, and also to a process for preparing synthetic resin shaped articles excellent in the abrasion resistance and weatherability by using this coating composition.

2. Description of the Prior Art

Synthetic resin shaped articles prepared from polymethyl methacrylate resins, polycarbonate resins, and other similar resins have a light weight and are excellent in their impact resistance, and these synthetic resins are cheap and can easily be molded. Because of these various advantages, these synthetic resin shaped articles have been used in various fields and new uses of these synthetic resin shaped articles have been developed in various fields. However, these synthetic resin shaped articles are poor in the abrasion resistance, and therefore, the surfaces are readily damaged by contact with a hard article or abrasion or scratching. Damage caused on the surfaces of these shaped articles lower the commercial value thereof drastically and shorten the service lives of these shaped articles. Therefore, it has eagerly been desired to improve the abrasion resistance of the surface in these synthetic resin shaped articles. Shaped articles having an improved abrasion resistance, which are prepared by coating the above-mentioned synthetic resin shaped article with a coating material, are often used outdoors. For example, they are used as windshields of air planes, outdoor signboards, traffic control signs and automobile parts, and therefore, a high weatherability is also eagerly desired in these shaped articles.

Various methods have heretofore been proposed as means for eliminating these defects of the above-mentioned synthetic resin shaped articles. For example, there can be mentioned a method in which a coating material comprised of a resin composition comprising a silicone or melamine type resin is coated on the surface of a synthetic resin shaped article and then, the coating material is heated to be thereby condensed to yield a crosslinked coating film having an improved abrasion resistance on the synthetic resin shaped article, and a method in which a polyfunctional monomer containing at least two polymerizable groups in the molecule is coated on the surface of a synthetic resin shaped article and then, the coated shaped article is irradiated with active energy rays to form a crosslinked and cured coating film on the surface of the synthetic resin shaped article, whereby a synthetic resin shaped article having an excellent abrasion resistance is obtained (see U.S. Pat. Nos. 3,518,341 and 4,041,120 and Japanese Laid-open Patent Applications Nos. 102,936/78, 104,638/78 and 97,633/79).

Indeed, the abrasion resistance of the surface of synthetic resin shaped articles can be improved by these methods. However, these methods are not completely satisfactory in some points. For example, the products obtained according to the former method are poor in durability to thermal shocks and hot water, and in chemical resistance. Furthermore, although the products obtained according to the latter method are satisfactory in durability and chemical resistance, they are poor in weatherability and must be produced in an atmosphere of an inert gas which is costly.

Under such background, we did research with a view to developing a synthetic resin shaped article excellent in not only abrasion resistance but also weatherability, and we have now found that when a coating composition comprising at specific ratios a monomer mixture comprising a specific polyfunctional acrylate and a specific monofunctional acrylate in a specific proportion, and a photosensitizer optionally with a specified light stabilizer and a specified silicone type surface active agent is coated on a synthetic resin shaped article and is then cured, a synthetic resin shaped article having excellent abrasion resistance and weatherability can be advantageously obtained.

SUMMARY OF THE INVENTION

In accordance with one fundamental aspect of the present invention, there is provided a coating composition comprising:

(a) a polyfunctional monomer mixture comprising (i) 25% to 75% by weight of at least one polyfunctional mono- or poly-pentaerythritol polyacrylate monomer containing at least three acryloyloxy groups in the molecule and represented by the following general formula (I):

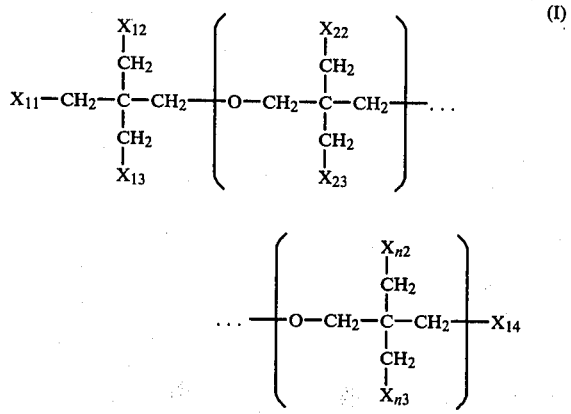

wherein at least of $X_{11}$, $X_{12}$, $X_{13}$, $X_{22}$, $X_{23}$-$X_{n2}$, $X_{n3}$ and $X_{14}$ are acryloyloxy groups ($CH_2=CH.COO-$) and the remaining groups are hydroxyl groups ($-OH$), and n is an integer of from 1 to 5, (ii) 25% to 75% by weight of at least one polyfunctional monomer represented by the following general formula (II):

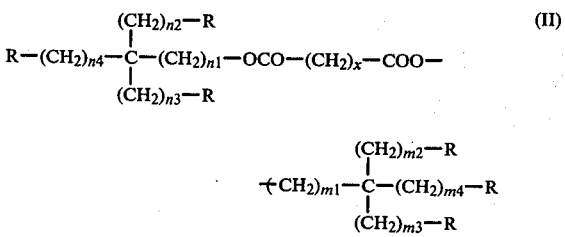

wherein at least three of the Rs are acryloyloxy groups ($CH_2=CH.COO-$) and each of the remaining is hydrogen or a hydroxyl group, $n_1$, $n_2$, $n_3$, $n_4$, $m_1$, $m_2$, $m_3$ and $m_4$ are integers of 0, 1 or 2, and x is an integer of from 1 to 10, and (iii) 0% to 50% by weight of a monomer containing one acryloyloxy group in the molecule and having a boiling point of at least 150° C. at normal pressure and a viscosity of not higher than 20 cps as measured at 20° C., and (b) 0.01 to 6.0 parts by weight, based on 100 parts by weight of the polyfunctional monomer mixture (a) mentioned above, of at least one photosensitizer.

In accordance with another fundamental aspect of the present invention, there is provided a process for the preparation of synthetic resin shaped articles excellent in abrasion resistance and weatherability, which comprises coating the surface of a synthetic resin shaped article with the above-mentioned coating composition and irradiating the coated shaped article with ultraviolet rays in air to form a crosslinked and cured coating film having a thickness of 1 to 30 microns.

DESCRIPTION OF THE PREFERRED EMBODIMENTS

As the polyfunctional mono- or poly-pentaerythritol polyacrylate monomer represented by the general formula (I), there can be mentioned, for example, dipentaerythritol triacrylate, dipentaerythritol tetraacrylate, dipentaerythritol pentaacrylate and dipentaerythritol bexaacrylate. These polyfunctional polyacrylate monomers are advantageous in that they exhibit a good polymerizing activity under irradiation with ultraviolet rays in air and good handling characteristics. These polyfunctional polyacrylate monomers may be used either alone or in combination.

If the above-mentioned polyfunctional monomer represented by the general formula (I) is used alone, i.e., not in combination with the polyfunctional monomer represented by the general formula (II), the monomer is readily polymerized under irradiation with ultraviolet rays in air and resulting crosslinked and cured coating film exhibits good abrasion resistance and surface hardness. However, this coating film is poor in weatherability and, when the coating film is exposed under natural conditions or accelerated weathering conditions for a long period of time, the film is deteriorated to a considerable extent and the formation of cracks and roughening are caused thereon and its adhesion to the substrate shaped article becomes reduced.

If the polyfunctional monomer represented by the general formula (II) is used not in combination with the polyfunctional monomer represented by the general formula (I), the monomer is not readily curable under irradiation with ultraviolet rays in air, namely, the coating exhibits poor drying and hardening characteristics. The resulting crosslinked and cured coating film is also poor in weatherability and, when the coating film is exposed under natural conditions or accelerated weathering conditions wherein, for example, sunshine or a carbon arc is utilized, the adhesion of the coating film to the substrate shaped article becomes reduced to a considerable extent.

It would be surprising that the combined use of the polyfunctional monomer of the formula (I) with the polyfunctional monomer of the formula (II) at the specified proportion obviates the above-mentioned defects of these monomers. Namely, the poor curable properties of the polyfunctional monomer of the formula (II) can be obviated and, furthermore, the poor weatherability of the respective coating films prepared from these polyfunctional monomers of the formulae (I) and (II) can be obviated. Thus, crack formation and roughening on the surface of the resulting abrasion-resistant synthetic resin shaped articles can be avoided, and reduction in the adhesion of the cured coating film to the substrate shaped articles and separation of the film from the substrate shaped articles can be prevented. Consequently, the resulting abrasion-resistant synthetic resin shaped articles can maintain an attractive appearance over a long period of time.

The amount of the polyfunctional monomer represented by the general formula (I) is in the range of from 25 to 75% by weight, preferably from 30 to 60% by weight, based on the weight of the polyfunctional monomer mixture. If the amount of the polyfunctional monomer of the formula (I) is smaller than 25% by weight, the cured coating film is not satisfactory in abrasion resistance. In contrast, if the amount of the polyfunctional monomer of the formula (I) exceeds 75% by weight, the cured coating film has poor weatherability and smoothness.

The amount of the polyfunctional monomer represented by the general formula (II) is in the range of from 25 to 75% by weight, preferably from 30 to 60% by weight, based on the weight of the polyfunctional monomer mixture. If the amount of the polyfunctional monomer of the formula (II) is smaller than 25% by weight, the cured coating film does not have satisfactory weatherability. In contrast, if the amount of the polyfunctional monomer of the formula (II) exceeds 75% by weight, the coating composition has poor curing characteristics and the cured coating film does not have satisfactory weatherability as well as lacks abrasion resistance and surface hardness.

As the above-mentioned polyfunctional monomer represented by the general formula (II), there can be mentioned, for example, esters prepared by esterification of the following ingredients. In the preparation of the esters, the proportion of the respective reactive ingredients used can be stoichiometrically varied provided that the resulting esters satisfy the general formula (II). Combinations of the reactive ingredients used for the preparation of the esters include, for example, malonic acid/trimethylolethane/acrylic acid, malonic acid/trimethylolpropane/acrylic acid, malonic acid/glycerin/acrylic acid, malonic acid/pentaerythritol/acrylic acid, succinic acid/trimethylolethane/acrylic acid, succinic acid/trimethylolpropane/acrylic acid, succinic acid/glycerin/acrylic acid, succinic acid/pentaerythritol/acrylic acid, adipic acid/trimethylolethane/acrylic acid, adipic acid/trimethylolpropane/acrylic acid, adipic acid/pentaerythritol/acrylic acid, adipic acid/glycerin/acrylic acid, glutaric acid/trimethylolethane/acrylic acid, glutaric acid/trimethylolpropane/acrylic acid, glutaric acid/glycerin/acrylic acid, glutaric acid/pentaerythritol/acrylic acid, sebacic acid/trimethylolethane/acrylic acid, sebacic acid/trimethylolpropane/acrylic acid, sebacic acid/glycerin/acrylic acid and sebacic acid/pentaerythritol/acrylic acid. Of these combinations, malonic acid/trimethylolethane/acrylic acid, malonic acid/trimethylolpropane/acrylic acid, succinic acid/trimethylolethane/acrylic acid, succinic acid/trimethylolpropane/acrylic acid, adipic acid/trimethylolethane/acrylic acid and adipic acid/trimethylolpropane/acrylic acid are preferable because esters prepared from these reactive ingredients result in coating films having a more enhanced weatherability. The above-listed combinations of reactive ingredients may be used either alone or in combination.

The monofunctional monomer containing one acryloyloxy group in the molecule and having a boiling point of at least 150° C. at normal pressure and a viscosity of not higher than 20 cps as measured at 20° C. (hereinafter referred to as "monofunctional monomer" for brevity), may be advantageously used in combination with the polyfunctional monomers represented by the general formulae (I) and (II), when a smooth coated surface is formed upon application of the coating composition on a substrate shaped article and excellent flexibility and adhesion to the substrate shaped article are required for the crosslinked coating film. More specifically, in order to obtain a coating film exhibiting good adhesion to the substrate shaped article even when the film is exposed under natural conditions or accelerated weathering conditions, a monofunctional monomer capable of dissolving the substrate shaped article and exhibiting a high polymerization activity should be used. Furthermore, in order to obtain a coating film having a good smoothness upon application of the coating composition of the present invention onto a shaped article, the viscosity of the polyfunctional monomer mixture should preferably be up to 1,000 cps, and accordingly, a monofunctional monomer satisfying the above requirements should be used.

As the monofunctional monomers, those which have a hydroxyl group and/or a cyclic ether linkage and/or a linear ether linkage, such as 2-hydroxyethyl acrylate, 2-hydroxypropyl acrylate, glycidyl acrylate, tetrahydrofurfuryl acrylate, ethoxyethyl acrylate, ethylcarbitol acrylate, butoxyethyl acrylate and 1,4-butylene glycol monoacrylate, are especially preferably used in the present invention, because these monomer are especially excellent in the polymerizing activity in air. These monofunctional monomers may be used either alone or in combination.

The proportion of the monofunctional monomer in the polyfunctional monomer mixture may be varied within the range of from 0% to 50% by weight based on the weight of the polyfunctional monomer mixture. The monofunctional monomer may not be contained in the polyfunctional monomer composition. It is preferable, however, that the monofunctional monomer is contained in an amount of from 10% to 40% by weight. When the amount of the monofunctional monomer exceeds 50% by weight based on the weight of the monomer mixture, a crosslinked coating film having a sufficient abrasion resistance cannot be obtained.

If the boiling point under atmospheric pressure of the monofunctional monomer is lower than 150° C., when the coating composition is coated and cured on the surface of a shaped article, the monofunctional monomer is volatilized and removed from the coating composition, resulting in an increase of the viscosity of the coating composition. In contrast, if the viscosity of the monofunctional monomer exceeds 20 cps as measured at 20° C., it is impossible to effectively reduce the viscosity of the polyfunctional monomer composition.

As the photosensitizer used in the present invention, there can be mentioned, for example, carbonyl compounds such as benzoin, benzoin methyl ether, benzoin ethyl ether, benzoin isopropyl ether, acetoin, butyroin, toluoin, benzil, benzophenone, p-methoxybenzophenone, diethoxyacetophenone, α,α-dimethoxy-α-phenylacetophenone, methylphenyl glyoxylate, ethylphenyl glyoxylate, 4,4'-bis(dimethylaminobenzophenone) and 2-hydroxy-2-methyl-1-phenylpropan-1-one; sulfur compounds such as tetramethylthiuram monosulfide and tetramethylthiuram disulfide; azo compounds such as azobisisobutyronitrile and azobis-2,4-dimethylvaleronitrile; and peroxide compounds such as benzoyl peroxide and di-tert.-butyl peroxide. The photosensitizer is incorporated in an amount of 0.01 to 6.0 parts by weight based on 100 parts by weight of the polyfunctional monomer mixture. If the amount of the photosensitizer is too large, coloration of the crosslinked coating film is caused and the weatherability is reduced. If the amount of the photosensitizer is too small, the curability under irradiation of ultraviolet rays is reduced.

In order to greatly improve the weatherability of the coating film, it is preferable that the coating composition of the present invention contains a minor amount of a light stabilizer having a cyclic hindered amine structure.

The light stabilizer having a cyclic hindered amine structure used in the present invention is represented by the following general formula (III):

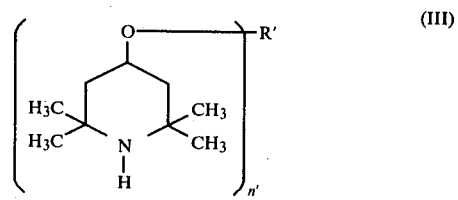

wherein n' is an integer of from 1 to 4 and, when n' is 1, R' is an acyl group derived from an aliphatic or aromatic monocarboxylic acid; when n' is 2, R' is a carbonyl group or a diacyl group derived from an aliphatic or aromatic dicarboxylic acid; when n' is 3, R' is a triacyl group derived from an aliphatic or aromatic tricarboxylic acid; and, when n' is 4, R' is a tetraacyl group derived from an aliphatic or aromatic tetracarboxylic acid. As the light stabilizer, there can be mentioned, for example, 4-benzoyloxy-2,2,6,6-tetramethylpiperidine, 4-hexanoyloxy-2,2,6,6-tetramethylpiperidine, 4-octanoyloxy-2,2,6,6-tetramethylpiperidine, 4-stearoyloxy-2,2,6,6-tetramethylpiperidine, bis(2,2,6,6-tetramethyl-4-piperidyl) succinate, bis(2,2,6,6-tetramethyl-4-piperidyl) sebacate, bis(2,2,6,6-tetramethyl-4-piperidyl) phthalate and tris(2,2,6,6-tetramethyl-4-piperidyl) trimesate. These light stabilizers may be used either alone or in combination.

The light stabilizer having a cyclic hindered amine structure imparts to the cured coating film excellent weatherability and stability when the light stabilizer is incorporated into the coating composition in a minor amount. The amount of the light stabilizer is preferably in the range of from 0.01 to 2.0 parts by weight based on 100 parts by weight of the polyfunctional monomer mixture. When the amount of the stabilizer is smaller than 0.01 part by weight, a significant effect cannot be attained. In contrast, when the amount of the stabilizer exceeds 2.0 parts by weight, undesirable whitening or haze formation in the cured coating film is occasionally observed.

It is more preferable that an antioxidant is used in combination with the light stabilizer having a cyclic hindered amine structure, because an antioxidant synergistically enhances the light stabilizer's improvement effect in weatherability and stability. It is to be noted that this synergistic improvement effect can hardly be observed unless the polyfunctional monomer represented by the general formula (II) is incorporated into the coating composition. The amount of antioxidant may be minor and usually in the range of from 0.01 to 2.0 parts by weight based on 100 parts by weight of the polyfunctional monomer mixture. When the amount of the stabilizer is too small, a significant synergistic effect cannot be attained. In contrast, when the amount of the antioxidant is too large, whitening or haze formation in the cured coating film is occasionally observed.

As antioxidants, there can be mentioned, for example, octadecyl 3-(3,5-di-tert.butyl-4-hydroxyphenyl)-propionate, pentaerythrityl tetrakis[3-(3,5-di-tert.butyl-4-hydroxyphenyl)-propionate], 1,6-hexanediol bis-3-(3,5-di-tert.butyl-4-hydroxyphenyl)-propionate, 2,2'-thiodiethyl-bis-[3-(3,5-di-tert.butyl-4-hydroxyphenyl)-propionate], 2,4-bis(n-octylthio)-6-(4-hydroxy-3,5-di-tert-.butylanilino)-1,3,5-triazine, diethyl 3,5-di-tert.butyl-4-hydroxybenzylphosphate, 1,3,5-tris(4-tert.butyl-3-hydroxy-2,6-dimethylbenzyl)isocyanuric acid, 4-methyl-2,6-di-tert.butylphenol, 4-methyl-2,6-bis(1-methylheptadecyl)-phenol, 2,2'-methylenebis(4-ethyl-6-tert-.butylphenol) and 1,3,5-tris(4-hydroxy-3,5-di-tert.butylbenzyl)-2,4,6-trimethylbenzene. These antioxidants may be used either alone or in combination.

A silicone type surface active agent may preferably be incorporated in the coating composition of the present invention for improving the smoothness of the crosslinked coating film, and if there is a risk of occurrence of whitening due to contact with an organic solvent, this component is necessary for preventing occurrence of this undesirable phenomenon.

This surface active agent may be incorporated in the composition of the present invention in an amount of 0.0001 to 2.0 parts by weight based on 100 parts by weight of the polyfunctional monomer mixture. If the amount of the surface active agent is smaller than 0.0001 part by weight, no substantial effects can be attained by incorporation of the surface active agent, and if the amount of the surface active agent exceeds 2.0 parts by weight, the smoothness of the coating film is reduced.

The kind of the silicone type surface active agent is not particularly critical in the present invention. However, it is recommendable to use a silicone type surface active agent having a molecular structure comprised of polydimethylsiloxane units, parts of which are modified with a polyoxyalkylene group, as disclosed in Japanese Patent Application No. 4,569/79. It is preferred that the degree of modification be such that 0.1 to 10.0 units of at least one oxyalkylene group selected from $-OCH_2CH_2-$, $-OCH_2CH(CH_3)-$ and the like are bonded to one methylsiloxane unit $CH_3(SiO)_{1/2}-$. If the degree of modification with an oxyalkylene group is lower than 0.1, the smoothness of the coating film is rather worse than in the case where the silicone type surface active agent is not added, and if the degree of modification with an oxyalkylene gorup is more than 10, the smoothness of the coating film is degraded.

If necessary, at least one or other vinyl monomers exhibiting a polymerizing activity under irradiation with ultraviolet rays may be incorporated in order to impart, for example, antistatic and anti-fogging properties to the crosslinked coating film. Furthermore, minor amounts of synergistic stabilizers and other stabilizers may be added according to need. The synergistic stabilizers include, for example, didodecyl 3,3'-thiobispropionate, dioctadecyl 3,3'-thiobispropionate and N,N',N''-hexamethylphosphoric triamide.

Various coating methods such as brush coating, flow coating, spray coating, rotary coating and dip coating methods can be adopted for coating the coating composition of the present invention on a synthetic resin shaped article. From the viewpoints of the adaptability of the coating composition to the coating composition, the smoothness and uniformity of the coating and the adhesion of the crosslinked coating film to the substrate shaped article, it is most recommendable to adopt the dip coating method using an appropriate organic solvent.

At the organic solvent to be utilized in the dip coating method, there is preferably used an organic solvent which is capable of forming a homogeneous solution when mixed with the coating composition and has a boiling point of 50° to 200° C. under atmospheric pressure and a viscosity of lower than 10 cps at normal temperature, such as disclosed in Japanese Laid-Open Patent Application No. 102,936/78.

The organic solvent is used in an amount of 90 to 20 parts by weight per 10 to 80 parts by weight of the coating composition (that is, the total amount is 100 parts by weight). When the amount of the organic solvent used is smaller than 20 parts by weight, a coating excellent in the smoothness and uniformity cannot be obtained, and if the amount of the organic solvent exceeds 90 parts by weight, the resulting film becomes too thin and the surface hardness is degraded.

As the organic solvent used in the present invention, there can be mentioned, for example, alcohols such as ethanol, isopropanol, n-propanol, isobutyl alcohol and n-butyl alcohol; aromatic hydrocarbons such as benzene, toluene, xylene and ethylbenzene; ketones such as acetone and methyl ethyl ketone; ethers such as dioxane; and esters such as ethyl acetate, n-butyl acetate and ethyl propionate. These organic solvents may be used alone. Alternatively, a mixture of two or more of them may be used so far as it satisfies the above-mentioned requirements of the boiling point, viscosity and mixing ratio.

The coating composition should be coated on the surface of a synthetic resin shaped article in such an amount that the thickness of the resulting crosslinked coating film is 1 to 30 microns, preferably 2.5 to 20 microns. If the thickness of the crosslinked coating film is smaller than 1 micron, the weatherability-improving effect is low, and if the thickness of the coating film is larger than 30 microns, the adhesion to the substrate shaped article is reduced, cracking or hazing is readily caused, or no good curing of the coating composition is attained under irradiation with ultraviolet rays.

Active energy rays, for example, radioactive rays such as electron beams, α-rays, β-rays and γ-rays emitted from an electron accelerator of 20 to 2,000 KV, may be used as means for curing the coating composition of the present invention. However, in order to obtain a crosslinked and cured coating film having such a good hardness as intended in the present invention, it is preferred that the coating composition be irradiated with ultraviolet rays having a wave length of 1,500 to 8,000 A.

The irradiation of the coating composition with ultraviolet rays can be effected either in an inert gas atmosphere such as nitrogen, carbon dioxide or argon, or air. However, the coating composition of the present invention can be advantageously irradiated with ultraviolet rays in an ordinary air atmosphere without using an expensive inert gas.

As the synthetic resin shaped article on which a crosslinked coating film is formed from the coating composition of the present invention for producing a synthetic resin shaped article excellent in both the abrasion resistance and weatherability, there can be used shaped articles of various synthetic resins which may be either thermoplastic or thermosetting. For example, there can be mentioned sheet-like shaped articles film-like shaped articles, rod-like molded articles and various injection molded articles, which are prepared from polymethyl methacrylate resins, polycarbonate resins, polyallyldiglycol carbonate resins, polystyrene resins, acrylonitrile-styrene copolymer resins (AS resins), polyvinyl chloride resins, acetate resins, ABS resins and polyester resins. Among these shaped articles, those prepared from polymethyl methacrylate resins and polycarbonate resins are advantageously used because of their excellent characteristics such as good optical properties, high heat resistance and high impact resistance, and because, improvements in the abrasion resistance and weatherability of these resin shaped articles (especially in the weatherability of polycarbonate resins) are especially eagerly desired.

Synthetic resin shaped articles having excellent abrasion resistance and weatherability, which are prepared by using the coating composition of the present invention, are also excellent in such properties as smoothness, water resistance, chemical resistance and durability, and these properties are hardly reduced under severe conditions in environments containing oxygen, ozone, rain water and gasses contained in air or under influences of heat and the like. Therefore, synthetic resin shaped articles can be advantageously utilized in the fields where high abrasion resistance and weatherability are required.

The present invention will now be described in detail with reference to the following Example that by no means limit the scope of the invention.

In these Examples, the properties of crosslinked coating films were determined and evaluated according to the following methods.

(1) Abrasion resistance:

Steel wool of #000 was attached to the top end of a cylinder having a diameter of 25 mm and brought into contact with the surface of a sample placed horizontally. The cylinder was rotated 5 turns at 20 rpm under a load of 1.0 Kg on the sample, and the degree of damaging of the sample surface was observed with the naked eye and the abrasion resistance was evaluated according to the following standard.

A: no scratch on the sample surface
B: slightly scratched
C: considerably scratched
D: completely scratched (2) Adhesion:

The cross-cut adhesive cellophane tape peel test was carried out. More specifically, eleven cuts reaching the substrate were formed on the crosslinked coating film at intervals of 1 mm in both the longitudinal and lateral directions, to form 100 square cuts each having an area of 1 mm². An adhesive cellophane tape was applied to the cut coating film and it was rapidly peeled off from the coating film. This test of application-and-peeling off was repeated one to three times on the same area of the coating film. The adhesion was evaluated according to the following standard.

A: none of square cuts of the film peeled even when the test was repeated for a total of three times in all.

B: none of the square cuts peeled at the first test but peeling off of square cuts was observed at the second test et seq.
C: 1 to 50 square cuts peeled at the second test et seq.
D: 51 to 100 square cuts peeled at the second test et seq.

(3) Surface smoothness:

The surface smoothness was evaluated according to the following standard.

A: excellent surface smoothness of the coating like mirror-finished surface
B: good surface smoothness of the coating
C: slight unevenness on the surface of the coating
D: considerable unevenness on the surface of the coating and poor smoothness (4) Appearance:

The appearance was evaluated according to the following standard.

(a) Discoloration or hazing:
A: neither discoloration (yellowing or whitening) nor hazing
B: slight discoloration or hazing
C: moderate discoloration or hazing
D: prominent discoloration or hazing (b) Crack formation or film separation:
A: none observed
B: slight cracking observed
C: cracking apparent
D: very noticeable cracking observed (5) Weatherability:

The weatherability test was carried out by using a sunshine carbon wheatherometer (Model WE-SUN-HC supplied by Toyo Rika) under conditions of a raining time of 18 minutes and a cycle period of 120 minutes, and by using an ultraviolet carbon weatherometer (Model WE-2 supplied by Toyo Rika) under conditions of a raining time of 12 minutes and a cycle period of 60 minutes.

REFERENCE EXAMPLE 1

Preparation of esterification product of succinic acid/trimethylolethane/acrylic acid A two liter volume glass flask provided with a thermocouple, a stirrer and a water separator was charged with 120.2 g (1 mole) of trimethylolethane, 65.0 g (0.55 mole) of succinic acid, 158.6 g (2.20 moles) of acrylic acid, 1,000 g of toluene, 3 g of $Cu_2Cl_2$ and 13.5 g of p-toluenesulfonic acid. The content was maintained at a preset temperature of 115° C. for 7 hours whereby 52 ml of water were distilled off therefrom. After the flask was cooled, the liquid reaction mixture was washed two times with an aqueous 0.5% $H_2SO_4$ solution and then three times with deionized water.

Thereafter, 0.14 g of hydroquinone monomethyl ether (MEHQ) was added to the washed liquid reaction mixture so that the concentration of MEHQ was about 500 ppm. Toluene was removed from the liquid reaction mixture at 50° to 60° C. by using a water jet vacuum pump over a period of 6 hours thereby to obtain a viscous light yellow compound (hereinafter referred to as "TAS" for brevity) as a still-bottom product. This compound had a viscosity of 8,500 cps at 20° C., an acid value of 14.0 and a bromine number of 99.

REFERENCE EXAMPLE 2

Preparation of esterification product of adipic acid/trimethylolethane/acrylic acid

A flask similar to that used in Reference Example 1 was charged with 120.2 g (1 mole) of trimethylolethane, 80.4 g (0.55 mole) of adipic acid, 158.6 g (2.20 moles) of acrylic acid, 1,000 g of toluene, 3 g of $Cu_2Cl_2$ and 13.5 g of p-toluenesulfonic acid. The content was maintained at a preset temperature of 115° C. for 6 hours whereby 53 ml of water were distilled off therefrom. After the flask was cooled, the liquid reaction mixture was washed once with an aqueous 0.5% $H_2SO_4$ solution and then five times with deionized water.

Thereafter, 0.15 g of MEHQ was added to the washed liquid reaction mixture. Then, toluene was removed from the liquid reaction mixture at 50° C. by using a water jet vacuum pump over a period of 6 hours thereby to obtain a viscous light yellow compound (hereinafter referred to as "TAA" for brevity) as a still-bottom product. This compound had a viscosity of 11,000 cps at 20° C., an acid value of 8.5 and a bromine number of 90.

REFERENCE EXAMPLE 3

Preparation of esterification product of adipic acid/trimethylolpropane/acrylic acid

A flask similar to that used in Reference Example 1 was charged with 134,2 g (1 mole) of trimethylolpropane, 80.4 g (0.55 mole) of adipic acid, 158.6 g (2.20 moles) of acrylic acid, 1,000 g of toluene, 3 g of $Cu_2Cl_2$ and 13.5 g of p-toluenesulfonic acid. The content was maintained at a preset temperature of 115° C. for 8 hours whereby 51 ml of water were distilled off therefrom. After the flask was cooled, the liquid reaction mixture was washed two times with an aqueous 0.5% $H_2SO_4$ solution and then three times with deionized water.

Thereafter, 0.15 g of MEHQ was added to the washed liquid reaction mixture. Then, toluene was removed from the liquid reaction mixture at 50° C. by using a water jet vacuum pump over a period of 8 hours thereby to obtain a viscous light yellow compound (hereinafter referred to as "TPA" for brevity) as a still-bottom product. This compound had a viscosity of 8,800 cps at 20° C., an acid value of 25.1 and a bromine number of 82.1.

EXAMPLE 1

A polymethyl methacrylate sheet (trade name "ACRYLITE" supplied by Mitsubishi Rayon K.K.) having a thickness of 4 mm was dipped in a liquid coating composition comprising 15 parts by weight of dipentaerythritol hexaacrylate, 15 parts by weight of dipentaerythritol pentaacrylate, 10 parts by weight of dipentaerythritol tetraacrylate, 25 parts by weight of TAS (i.e., an esterification product prepared in Reference Example 1), 35 parts by weight of tetrahydrofurfuryl acrylate, 1 part by weight of bis (2,2,6,6-tetramethyl-4-piperidyl) sebacate (light stabilizer), 0.2 part by weight of octadecyl 3-(3,5-di-tert.butyl-4-hydroxyphenyl) propionate (antioxidant), 0.25 part by weight of a silicone type surface active agent, 1.5 parts by weight of benzoin isopropyl ether, 3 parts by weight of benzophenone, 120 parts by weight of isopropyl alcohol and 50 parts by weight of toluene. The sheet was pulled out from the composition to form a coating thereon. The sheet was allowed to stand for 2 minutes, and both the surfaces of the coated sheet were irradiated two times with ultraviolet rays emitted from high pressure mercury lamps (ozone type) of 2 KW located at positions a distance of 20 cm from the surfaces of the coated sheet, respectively, for 1.1 seconds. The so cured coating of the sheet had a thickness of 3.5 microns. The abrasion resistance, adhesion, smoothness and initial appearance (discoloration and hazing) of the cured coating were good (all of the ratings for these characteristics were A), and also the appearance and adhesion after accelerated 1,500 hours' sunshine exposure were good (the ratings therefor were A).

EXAMPLES 2 THROUGH 4 AND COMPARATIVE EXAMPLES 1 THROUGH 4

Curable liquid compositions shown in Table I, below, were prepared and a polymethyl methacrylate sheet having a thickness of 3 mm was dipped in each composition and then pulled out from the composition to form a coating thereon. The sheet was allowed to stand for 3 minutes, and both the surfaces of the coated sheet were irradiated in air two times with ultraviolet rays for 13 seconds by using high pressure mercury lamps (ozone type) of 2 KW located at positions a distance of 20 cm from the surface of the coating, respectively. The obtained results are shown in Table I, below.

TABLE I

| | | | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|
| Coating Composition (parts by weight) | Monomers | 2P5A*1 | 40 | 30 | 40 | 75 | — | — | 75 |
| | | TAS*2 | 35 | 45 | 35 | — | 75 | — | — |
| | | TMPTA*3 | — | — | — | — | — | 75 | — |
| | | THF—A*4 | 25 | 25 | 25 | 25 | 25 | 25 | 25 |
| | Light stabilizer*5 | | 1 | 1 | — | 1 | 1 | 1 | 1 |
| | Antioxidant*6 | | 0.2 | 0.2 | — | 0.2 | 0.2 | 0.2 | 0.2 |
| | Silicone type surface active agent | | 0.3 | 0.3 | — | 0.3 | 0.3 | 0.3 | 0.3 |
| | Photo-sensitizer | BEE*7 | 1.5 | 1.5 | 1.5 | 1.5 | 1.5 | 1.5 | 1.5 |
| | | BNP*8 | 2.5 | 2.5 | 2.5 | 2.5 | 2.5 | 2.5 | 2.5 |
| | Diluent | Iso-PrOH*9 | 80 | 80 | 80 | 80 | 80 | 80 | 80 |
| | | Toluene | 70 | 70 | 70 | 70 | 70 | 70 | 70 |
| Initial Properties | Film thickness (μ) | | 4 | 4 | 4 | 4 | 4 | un-hardened | 4 |
| | Abrasion resistance | | A | A | A | A | C | | A |

TABLE I-continued

|  |  |  | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|
|  | Adhesion |  | A | A | A | A | B |  | A |
|  | Smoothness |  | A | A | B | A | A |  | A |
|  | Appear-ance (a) |  | A | A | A | A | B |  | A |
| Weather-ability test (sunshine carbon weather-ometer) | 1000 hours | Appear-ance (b) | A | A | A | B | B | — | B |
|  |  | ance (b) | A | A | A | D | C | — | B |
|  |  | Adhesion | A | A | A | D | D | — | B |
|  | 1500 hours | Appear (a) | A | A | B | D | D | — | D |
|  |  | ance (b) | A | A | B | D | D | — | D |
|  |  | Adhesion | A | A | B | D | D | — | D |

*¹2P5A: dipentaerythritol pentaacrylate
*²TAS: esterification product prepared in Reference Example 1
*³TMPTA: trimethylolpropane triacrylate
*⁴THF—A: tetrahydrofurfuryl acrylate
*⁵Light stabilizer: bis(2,2,6,6-tetramethyl-4-piperidyl) sebacate
*⁶Antioxidant: pentaerythrityl tetrakis [3-(3,5-di-tert.butyl-4-hydroxyphenyl) propionate]
*⁷BEE: benzoin ethyl ether
*⁸BNP: benzoin n-propyl ether
*⁹Iso-PrOH: isopropyl alcohol

EXAMPLES 5 THROUGH 8 AND COMPARATIVE EXAMPLE 5

Curable liquid compositions shown in Table II, below, were prepared, and a polycarbonate sheet having a thickness of 4 mm (trade name "Upilon", supplied by Mitsubishi Gas Kagaku) was dipped in each composition and then pulled out from the composition to form a coating thereon. The sheet was allowed to stand for 3 minutes. Then, both the surfaces of the coated sheet were exposed in air two times to ultraviolet rays emitted from high pressure mercury lamps (ozone type) of 2 KW located at positions a distance of 20 cm from the surfaces of the sheet, respectively, for 10 seconds. The obtained results are shown in Table II, below.

TABLE II

|  |  |  | Ex. 5 | Ex. 6 | Ex. 7 | Ex. 8 | Comp. Ex. 5 |
|---|---|---|---|---|---|---|---|
| Coating Composition (parts by weight) | Monomers | 2P6A*¹ | 15 | 15 | 20 | 15 | 1⁵ |
|  |  | 2P5A | 15 | 15 | 20 | 15 | 15 |
|  |  | 2P4A*² | 10 | 10 | 5 | 10 | 10 |
|  |  | TAA*³ | 40 | — | — | 40 | 40 |
|  |  | TPA*⁴ | — | 40 | — | — | — |
|  |  | THF—A | 20 | 20 | 20 | 20 | 20 |
|  | Light*⁵ stabilizer*⁶ |  | 1.5 | 1.5 | 1.5 | — | 4 |
|  |  |  |  |  |  | 1.5 |  |
|  | Antioxidant*⁷ |  | 0.3 | 0.3 | 0.3 | 0.3 | 3 |
|  | Silicone type surface active agent |  | 0.2 | 0.2 | 0.2 | 0.2 | 0.2 |
|  | Photosensi-tizer BBi*⁸ |  | 2 | 2 | 2 | 2 | 2 |
|  | Diluent | Iso-PrOH | 120 | 120 | 120 | 120 | 120 |
|  |  | Xylene | 30 | 30 | 30 | 30 | 30 |
| Initial Properties | Film thickness (μ) |  | 4.5 | 4.5 | 4.5 | 4.5 | 4.5 |
|  | Abrasion resistance |  | A | A | A | A | B |
|  | Adhesion |  | A | A | A | A | A |
|  | Smoothness |  | A | A | A | A | A |
|  | Appearance (a) |  | A | A | A | A | D |
| Weatherability test (ultra-violet carbon weatherometer 800 hours) | Appear- (a) |  | B | B | B | B | — |
|  | ance (b) |  | A | A | A | A | — |
|  | Adhesion |  | A | A | A | A | — |
|  | Abrasion resistance |  | A | A | A | A | — |

*¹2P6A: dipentaerythritol hexaacrylate
*²2P4A: dipentaerythritol tetraacrylate
*³TAA: esterification product prepared in Reference Example 2
*⁴TPA: esterification product prepared in Reference Example 3
*⁵Light stabilizer: the same as that described in Table I
*⁶Light stabilizer: 4-benzoyloxy-2,2,6,6-tetramethylpiperidine
*⁷Antioxidant: octadecyl 3-(3,5-di-tert.butyl-4-hydroxyphenyl)propionate
*⁸BBi: benzoin isobutyl ether

EXAMPLE 9

A coating composition comprising 20 parts by weight of dipentaerythritol hexaacrylate, 20 parts by weight of dipentaerythritol pentaacrylate, 10 parts by weight of dipentaerythritol tetraacrylate, 35 parts by weight of TPA (i.e., an esterification product prepared in Reference Example 3), 5 parts by weight of ethylcarbitol acrylate, 10 parts by weight of 2-hydroxyethyl acrylate, 0.5 part of the same light stabilizer as that used in Example 1, 0.2 part by weight of 1,3,5-tris(4-hydroxy-3,5-ditert.-butylbenzyl)-2,4,6-trimethylbenzene(antioxidant), 0.2 part by weight of a silicone type surface active agent and 1.5 parts by weight of benzoin ethyl ether was coated by a bar coater on a polycarbonate injection molded sheet having a thickness of 5 mm. Both surfaces of the coated sheet were exposed in air two times to ultraviolet rays emitted from high pressure mercury lamps(ozone type) of 2 KW located at positions a distance of 20 cm from the surfaces of the sheet, respectively, for 13 seconds. The so cured coating of the sheet had a thickness of microns.

The abrasion resistance, initial appearance (discoloration and hazing) and adhesion of the obtained product were good. Also, the appearance and adhesion after 800 hours' weatherability test (ultraviolet carbon weatherometer) were good and no crack formation was observed.

EXAMPLES 10 THROUGH 13

Curable liquid compositions shown in Table III, below, were prepared, and a polymethyl methacrylate sheet having a thickness of 4 mm was dipped in each composition and then pulled out from the composition to form a coating thereon. The coated sheet was cured in the same manner as that described in Examples 4 through 7. The results are shown in Table III, below.

TABLE III

|  |  |  | Ex. 10 | Ex. 11 | Ex. 12 | Ex. 13 |
|---|---|---|---|---|---|---|
| Coating Composition (parts by weight) | Monomers | 2P6A | 15 | 10 | 10 | 15 |
|  |  | 2P5A | 15 | 15 | 15 | 20 |
|  |  | 2P4A | 5 | 5 | 5 | 10 |
|  |  | TAS | 40 | — | — | 25 |
|  |  | TAA | — | 45 | — | — |
|  |  | TAP | — | — | 45 | 15 |
|  |  | THF—A | 25 | 25 | 25 | 15 |
|  | Light stabilizer | same as that used in Ex. 2 | 0.5 | 0.5 | 0.5 | 0.5 |
|  | Antioxidant | same as that used in Ex. 2 | 0.2 | 0.2 | 0.2 | 0.2 |
|  | Silicone type surface active agent |  | 0.25 | 0.25 | 0.25 | 0.25 |
|  | Photosensitizer BBE |  | 1.5 | 1.5 | 1.5 | 1.5 |
|  | Diluent | Iso-PrOH | 120 | 120 | 120 | 120 |
|  |  | Iso-BuOH*[1] | 20 | 20 | 20 | 20 |
|  |  | Toluene | 40 | 40 | 40 | 40 |
| Initial Properties | Film thickness ($\mu$) |  | 3.5 | 3.5 | 3.5 | 3.5 |
|  | Abrasion resistance |  | A | A | A | A |
|  | Adhesion |  | A | A | A | A |
|  | Smoothness |  | A | A | A | A |
|  | Appearance (a) |  | A | A | A | A |
| Weatherability test (ultraviolet carbon weatherometer, 1,500 hours) | Appearance (a) |  | A | A | A | A |
|  | ance (b) |  | A | A | A | A |
|  | Adhesion |  | A | A | A | A |

*[1]Iso-BuOH: isobutyl alcohol

We claim:
1. A coating composition, which comprises:
(a) a polyfunctional monomer mixture comprising (i) 25% to 75% by weight of at least one polyfunctional mono- or poly-pentaerythritol polyacrylate monomer containing at least three acryloyloxy groups in the molecule and represented by formula (I):

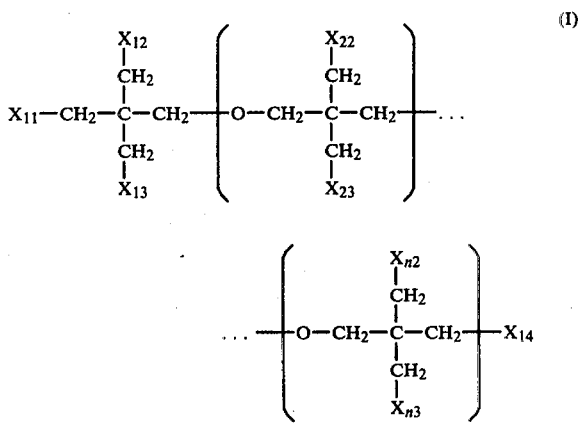

wherein at least three of $X_{11}$, $X_{12}$, $X_{13}$, $X_{22}$, $X_{23}$ ... $X_{n2}$, $X_{n3}$ and $X_{14}$ are acryloyloxy groups ($CH_2=CH.COO-$) and the remaining groups are hydroxyl groups ($-OH$), and n is an integer of from 1 to 5, (ii) 25% to 75% by weight of at least one polyfunctional monomer represented by formula (II):

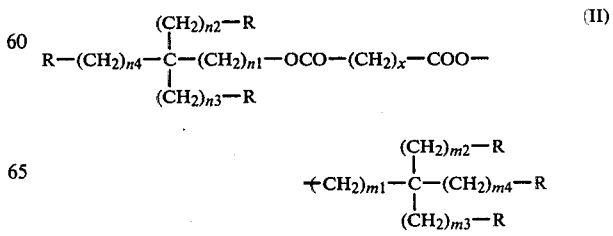

wherein at least three of the R groups are acryloyloxy groups (CH$_2$=CH.COO—) and each of the remaining is hydrogen or a hydroxyl group, n$_1$, n$_2$, n$_3$, n$_4$, m$_1$, m$_2$, m$_3$ and m$_4$ are integers of 0, 1 or 2, and x is an integer of from 1 to 10, and (iii) 0% to 50% by weight of a monomer containing one acryloyloxy group in the molecule and having a boiling point of at least 150° C. at normal pressure and a viscosity of not higher than 20 cps as measured at 20° C., and (b) 0.01 to 6.0 parts by weight, based on 100 parts by weight of the polyfunctional monomer mixture (a) mentioned above, of at least one photosensitizer.

2. The coating composition as set forth in claim 1, wherein at least one light stabilizer having a cyclic hindered amine structure is contained in an amount of 0.01 to 4.0 parts by weight based on 100 parts by weight of the polyfunctional monomer mixture.

3. The coating composition as set forth in claim 1 or 2, wherein at least one silicone type surface active agent modified with a polyoxyalkylene group is contained in an amount of 0.0001 to 2.0 parts by weight based on 100 parts by weight of the polyfunctional monomer mixture.

4. The coating composition as set forth in claim 1, wherein the monomer represented by the general formula (I) is dipentaerythritol triacrylate, dipentaerythritol tetraacrylate, dipentaerythritol pentaacrylate or dipentaerythritol hexaacrylate.

5. The coating composition as set forth in claim 1 or 2, wherein the polyfunctional monomer represented by the general formula (II) is selected from the group consisting of esters prepared by esterification of (i) malonic acid and acrylic acid with trimethylolethane, (ii) malonic acid and acrylic acid with trimethylolpropane, (iii) succinic acid and acrylic acid with trimethylolethane, (iv) succinic acid and acrylic acid with trimethylolpropane, (v) adipic acid and acrylic acid with trimethylolethane and (vi) adipic acid and acrylic acid with trimethylolpropane.

6. The coating composition as set forth in claim 1 or 2, wherein the monomer containing one acryloyloxy group in the molecule contains at least one moiety selected from the group consisting of a hydroxyl group and an ether linkage on the side chain in the molecule.

7. The coating composition as set forth in claim 2, wherein the light stabilizer having the cyclic hindered amine structure is represented by formula (III):

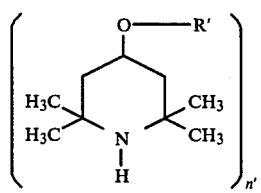

wherein n' is an integer of from 1 to 4 and, when n' is 1, R' is an acyl group derived from an aliphatic or aromatic monocarboxylic acid; when n' is 2, R' is a carbonyl group or a diacyl group derived from an aliphatic or aromatic dicarboxylic acid; when n' is 3, R' is a triacyl group derived from an aliphatic or aromatic tricarboxylic acid; and, when n' is 4, R' is a tetraacyl group derived from an aliphatic or aromatic tetracarboxylic acid.

8. A process for the preparation of synthetic resin shaped articles, which comprises:
coating the surface of a synthetic resin shaped article with a coating composition, and irradiating the coated shaped article with ultraviolet rays in air to form on the surface of the synthetic resin shaped article a crosslinked and cured film having a thickness of 1 to 30 microns, wherein said coating composition comprises:

(a) a polyfunctional monomer mixture comprising (i) 25% to 75% by weight of at least one polyfunctional mono- or poly-pentaerythritol polyacrylate monomer containing at least three acryloyloxy groups in the molecule and represented by formula (I):

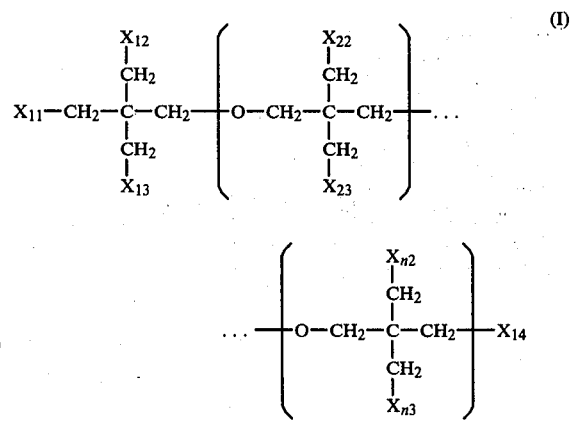

wherein at least three of X$_{11}$, X$_{12}$, X$_{13}$, X$_{22}$, X$_{23}$ ... X$_{n2}$, X$_{n3}$ and X$_{14}$ are acryloyloxy groups (CH$_2$=CH.COO—) and the remaining groups are hydroxyl groups (—OH), and n is an integer of from 1 to 5, (ii) 25% to 75% by weight of at least one polyfunctional monomer represented by formula (II):

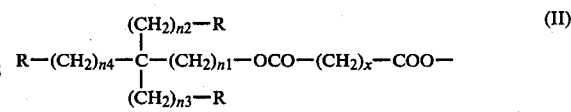

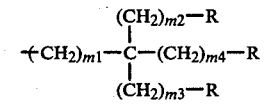

wherein at least three of the R groups are acryloyloxy groups (CH$_2$=CH.COO—) and each of the remaining is hydrogen or a hydroxyl group; n$_1$, n$_2$, n$_3$, n$_4$, m$_1$, m$_2$, m$_3$ and m$_4$ are integers of 0, 1 or 2; and x is an integer of from 1 to 10, and (iii) 0% to 50% by weight of a monomer containing one acryloyloxy group in the molecule and having a boiling point of at least 150° C. at normal pressure and a viscosity of not higher than 20 cps as measured at 20° C., and (b) 0.01 to 6.0 parts by weight, based on 100 parts by weight of the polyfunctional monomer mixture (a) mentioned above, of at least one photosensitizer.

9. The process for the preparation of synthetic resin shaped articles as set forth in claim 8, wherein 0.01 to 4.0 parts by weight, based on 100 parts by weight of the polyfunctional monomer mixture, of at least one light stabilizer having a cyclic hindered amine structure is incorporated in the polyfunctional monomer mixture.

10. The process for the preparation of synthetic resin shaped articles as set forth in claim 8, or 9 wherein 0.0001 to 2.0 parts by weight, based on 100 parts by weight of the polyfunctional monomer mixture, of at least one silicone type surface active agent modified with a polyoxyalkylene group is incorporated in the polyfunctional monomer mixture.

11. The process for the preparation of synthetic resin shaped articles as set forth in claim 8, wherein the monomer represented by formula (I) is depentaerythritol triacrylate, dipentaerythritol tetraacrylate, dipentaerythritol pentaarylate or dipentaerythritol hexaacrylate.

12. The process for the preparation of synthetic resin shaped articles as set forth in claim 8 or 9, wherein the polyfunctional monomer represented by formula (II) is selected from the group consisting of esters prepared by esterification of (i) malonic acid and acrylic acid with trimethylol ethane, (ii) malonic acid and acrylic acid with trimethylolpropane, (iii) succinic acid and acrylic acid with trimethylolethane, (iv) succinic acid and acrylic acid with trimethylolpropane, (v) adipic acid and acrylic acid with trimethylolethane and (vi) adipic acid and acrylic acid with trimethylolpropane.

13. The process for the preparation of synthetic resin shaped articles as set forth in claim 8 or 9, wherein the monomer containing one acryloyloxy group in the molecular contains at least one moiety selected from the group consisting of a hydroxyl group and an ether linkage on the side chain in the molecule.

14. The process for the preparation of synthetic resin shaped articles as set forth in claim 9, wherein the light stabilizer having the cyclic hindered amine structure is represented by formula (III):

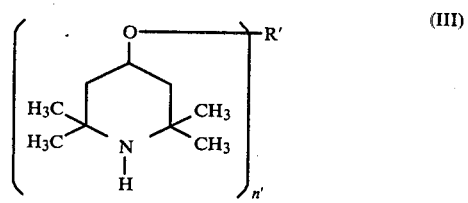

wherein $n'$ is an integer of from 1 to 4 and, when $n'$ is 1, $R'$ is an acyl group derived from an aliphatic or aromatic monocarboxylic acid; when $n'$ is 2, $R'$ is a carbonyl group or a diacryl group derived from an aliphatic or aromatic dicarboxylic acid; when $n'$ is 3, $R'$ is a triacyl group derived from an aliphatic or aromatic tricarboxylic acid; and, when $n'$ is 4, $R'$ is a tetraacyl group derived from an aliphatic or aromatic tetracarboxylic acid.

* * * * *